(No Model.)
A. KIPP, Jr.
CLUTCH.
No. 488,821. Patented Dec. 27, 1892.
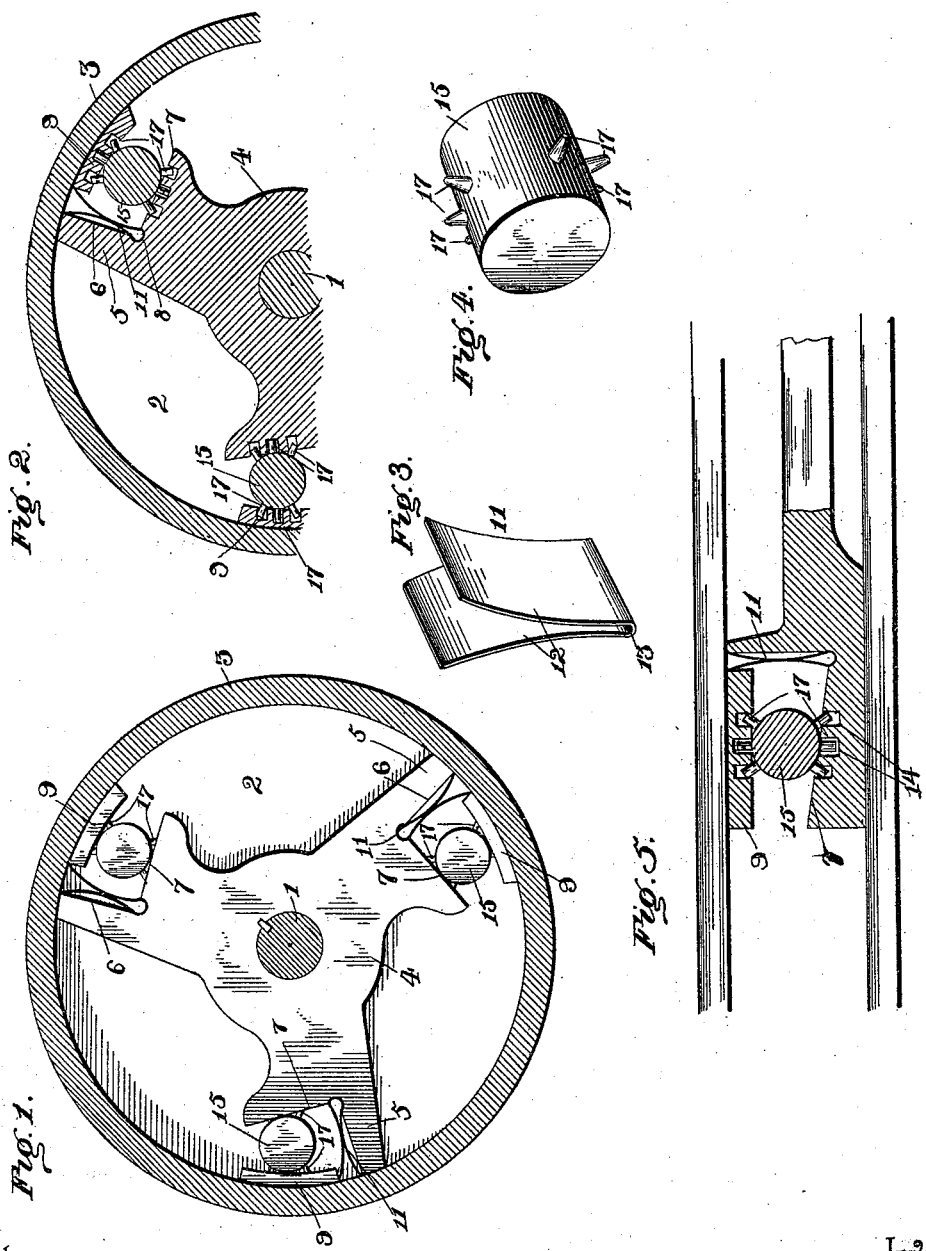
Witnesses:
J. M. Johnson
W. S. Duvall
Inventor
Abraham Kipp, Jr.
By his Attorneys,
C. A. Snow & Co.

UNITED STATES PATENT OFFICE.

ABRAHAM KIPP, JR., OF SING SING, NEW YORK.

CLUTCH.

SPECIFICATION forming part of Letters Patent No. 488,821, dated December 27, 1892.

Application filed February 19, 1891. Serial No. 382,025. (No model.)

*To all whom it may concern:*

Be it known that I, ABRAHAM KIPP, Jr., a citizen of the United States, residing at Sing Sing, in the county of Westchester and State of New York, have invented a new and useful Clutch, of which the following is a specification.

The invention relates to improvements in clutches.

The object of the present invention is to provide a simple and inexpensive friction clutch adapted to be employed in pulleys, lawn mowers and various other classes of machinery.

The invention consists in the construction and novel combination and arrangement of parts hereinafter fully described, illustrated in the accompanying drawings and pointed out in the claim hereto appended.

In the drawings—Figure 1 is a sectional view of a pulley showing a clutch constructed in accordance with this invention, the clutch mechanism being shown in side elevation. Fig. 2 is a sectional view through the clutch mechanism. Fig. 3 is a detail perspective view of the spring. Fig. 4 is a similar view of the roller. Fig. 5 is a sectional view showing a different application of the invention from that shown in the preceding figures.

Like numerals of reference indicate corresponding parts in all the figures of the drawings.

1 designates a shaft upon which is mounted loosely for rotation a pulley shell 2 having a peripheral flange 3. A hub 4 is mounted upon the shaft and is provided with radial arms 5 each of which carries clutch mechanism. Each arm 5 is provided at its outer end with a rectangular recess forming a rear wall 6 and a lower inclined bearing wall 7. Opposite each inclined bearing wall is located a shoe adapted to engage the flange of the pulley shell and having interposed between it and the inclined bearing wall 7 a horizontal roller 15 which is caused by a proper rotation of the shaft to roll up the inclined bearing wall 7, and wedge the shoe against the flange of the pulley shell and thereby lock the pulley shell to the shaft. It will be noticed that the roller, in the operation of the clutch, does not rub and wear the parts; but on the contrary, rolls and thereby avoids friction and wear. In order to maintain the roller and the shoe in proper relative position as with the arm, the parts are geared together. The shoe and the arm are provided in their opposed faces with recesses 14, which mesh with cog teeth 17 disposed at opposite sides of the roller. The cog teeth 17 do not touch the bottoms of the recesses and receive no end pressure; and this gearing is merely employed to preserve the proper relative positions of the parts and it is assisted by an approximately V-shaped spring 11 having its sides 12 bearing against the wall 6 and the shoe, and its bend 13 is arranged in a groove 8 at the angle of the recess of the arm. The spring is not absolutely essential and may be omitted.

In Fig. 5 of the accompanying drawings another application of the clutch is shown, the parts being arranged to engage a flat surface instead of a curved one as shown in the preceding figures.

What I claim is—

In a friction clutch, the combination of an arm having a rectangular recess forming a rear wall 6 and a lower inclined bearing wall 7, the latter being provided with a series of gearing recesses, an engaging shoe disposed opposite the lower wall 7 of the recess and provided with gearing recesses, and a roller interposed between the wall 7 and the shoe and provided with cog teeth disposed on opposite sides of it and meshing with the bearing recesses, whereby the parts are maintained in proper relation, substantially as described.

In testimony that I claim the foregoing as my own I have hereto affixed my signature in presence of two witnesses.

ABRAHAM KIPP, JR.

Witnesses:
E. G. SIGGERS,
J. H. SIGGERS.